US008378211B2

(12) United States Patent
Oka et al.

(10) Patent No.: US 8,378,211 B2
(45) Date of Patent: Feb. 19, 2013

(54) ELECTRIC CONNECTION BOX

(75) Inventors: Tatsuya Oka, Yokkaichi (JP); Yoshihiko Gotou, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 208 days.

(21) Appl. No.: 13/012,122

(22) Filed: Jan. 24, 2011

(65) Prior Publication Data

US 2012/0186849 A1   Jul. 26, 2012

(51) Int. Cl.
*H02G 3/08*   (2006.01)
(52) U.S. Cl. ............ 174/50; 174/59; 174/520; 174/559; 439/76.1; 439/76.2; 439/535
(58) Field of Classification Search ............ 174/50, 174/59, 520, 535, 559, 560, 562, 561, 541; 439/76.1, 76.2, 949, 535, 563, 573, 701, 439/532, 718, 717; 361/600, 601, 679.01, 361/730, 740, 752
See application file for complete search history.

(56) References Cited

U.S. PATENT DOCUMENTS

| 6,430,054 | B1 * | 8/2002 | Iwata | 439/76.2 |
| 6,800,807 | B2 * | 10/2004 | Ishiguro et al. | 174/50 |
| 6,919,509 | B2 * | 7/2005 | Oda | 174/59 |
| 7,351,911 | B2 * | 4/2008 | Chiriku et al. | 174/59 |
| 7,465,172 | B2 * | 12/2008 | Ishiguro et al. | 439/76.2 |
| 7,927,111 | B2 * | 4/2011 | Kita | 439/76.2 |
| 8,063,319 | B2 * | 11/2011 | Miyamoto | 174/541 |

FOREIGN PATENT DOCUMENTS

JP   A-2007-259590   10/2007

* cited by examiner

*Primary Examiner* — Angel R Estrada
(74) *Attorney, Agent, or Firm* — Oliff & Berridge, PLC (57) ABSTRACT

The invention provides an electric connection box having a novel structure in which a load applied to substrate terminals at the time of insertion and pulling out of electric components is alleviated with a small number of components, while the effective utilization of the printed board is realized. A circuit body is stacked on the printed board with an insulating plate interposed therebetween. The substrate terminals are formed so as to project from a surface of the printed board on the side where the circuit body is stacked at portions which are not covered with the circuit body, and each are formed with a locking portion to be placed on the surface of the printed board at a base portion thereof. On the other hand, pressing portions for pressing the locking portions are integrally formed with the insulating plate.

6 Claims, 9 Drawing Sheets

ELECTRIC CONNECTION BOX

BACKGROUND

An exemplary apparatus for an electric connection box to be mounted on an automotive vehicle or the like and, to an electric connection box configured in such a manner that terminals of electric components are inserted into, and pulled out from, substrate terminals on a printed board accommodated in the interior thereof is described herein. The present specification discloses the components and various exemplary combinations for their application and implementation.

DESCRIPTION OF THE RELATED ART

In the related art, an electric connection box such as a junction box is used for the purpose of improvement of efficiency of electric wiring and maintenanceability of an automotive vehicle. A printed board and the like which constitute an internal circuit are accommodated in the interior of the electric connection box. A plurality of substrate terminals each are soldered at one end thereof to a conducting path of the printed board, and the other ends of the plurality of substrate terminals project to the outside through an insertion hole of an electric component mounting portion provided on a case of the electric connection box. Accordingly, when electric components such as connectors, fuses, relays and the like provided at terminals of the electric wires are mounted on the electric component mounting portion, the terminals of the electric components are connected to the substrate terminals.

When inserting and pulling out the electric components with respect to the electric component mounting portion, a large external force is applied to soldered portions of the substrate terminals due to frictional resistance between the substrate terminals and the terminals of the electric components. Accordingly, for example, as disclosed in JP-A-2007-259590, a structure in which the substrate terminals are mounted and held on a holding member such as a base seat formed of synthetic resin and the holding member is held between the printed board and the case of the electric connection box, whereby the external force generated when the electric components are inserted or pulled out is prevented from affecting directly on the soldered portion is employed.

However, in the electric connection box having the structure as described in the related art, an additional member such as the holding member is required, and hence the number of components increases. Simultaneously, a specific holding member is manufactured for each type of connector or the like, which results in deterioration of manufacturing effect and cost increase. In addition, since the holding member is placed on the printed board, the area on the printed board made available for use is limited.

In particular, in association with increase in vehicle-mounted electric components in recent years, demands for higher densities and smaller sizes of the electric connection box have been steadily increasing, and employment of the substrate terminals which are not held by the base seats or the like, but are provided so as to project directly from the printed board, is increased for the effective utilization of the printed board. The terminals mounted directly on the substrate so as to project therefrom as described above are subject to a load directly when pulling out the electric components. Therefore, effective countermeasures for such circumstances have been desired.

SUMMARY

In view of such circumstances, it is an object of a preferred embodiment to provide an electric connection box having a novel structure in which a load applied to substrate terminals at the time of insertion and pulling out of the electric components is alleviated with a small number of components, while the effective utilization of the printed board is realized. The exemplary embodiments described herein detail for illustrative purposes and are subject to many variations in structure and design. It should be emphasized, however, that the present invention is not limited to a particularly disclosed embodiment shown or described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The terms "a" and "an" herein do not denote a limitation of quantity, but rather denote the presence of at least one of the referenced item.

A first aspect of a preferred embodiment is directed to an electric connection box including a printed board; a circuit body stacked on the printed board with an insulating plate interposed therebetween; and a substrate terminal formed so as to project from a surface of the printed board on the side where the circuit body is stacked, the substrate terminal projecting to the outside of a case accommodating the printed board and the circuit body through an insertion hole of an electric component mounting portion formed on the case, wherein the substrate terminal includes a locking portion formed on a base portion thereof and placed on the surface of the printed board, and the insulating plate includes a pressing portion integrally formed therewith to press the locking portion.

In this configuration, when an electric component such as a connector is pulled out, the pressing portions formed integrally with the insulating plate press the locking portion of the substrate terminal toward the printed board. Therefore, a pulling load, which is generated when mounting the electric component, is dispersed over the insulating plate, and the load to be exerted to a soldered portion of the substrate terminal is alleviated.

In particular, the pressing portion is only placed on the locking portion of the substrate terminal and is not placed on the printed board so as to protrude therefrom. Therefore, the load exerted on the soldered portion of the substrate terminal when the electric component is pulled out can be alleviated reliably without limiting the area of a mounting surface of the printed board to be used.

Since the pressing portion is formed by effectually using the insulating plate disposed between the printed board and a separate circuit body stacked thereon, reduction of the number of components is achieved. As the circuit body to be stacked on the printed board with the insulating plate interposed between the printed board and the circuit body, arbitrary circuit bodies such as the printed board, a bus bar circuit, a single core circuit may be employed.

A second aspect of a preferred embodiment is directed to the first aspect, wherein a peripheral edge portion of the electric component mounting portion of the case is placed on the insulating plate.

In this configuration, since the peripheral edge portion of the electric component mounting portion is supported on the printed board by the insulating plate, a pushing force applied when inserting the electric component is dispersed over the insulating plate, and hence the load to be exerted to the soldered portion of the substrate terminal is alleviated.

A third aspect of a preferred embodiment is directed to the first or second aspect, wherein the substrate terminal includes a connecting portion extending upright from the surface of the printed board and a soldered portion soldered to a conducting path on the printed board on both sides of the locking portion with respect to the direction of the length of the terminal, and the pressing portion is provided apart from the soldered portion.

In this configuration, since the soldered portion is exposed without being covered with the pressing portion, visual inspection of the soldered portion is easily achieved.

A fourth aspect of a preferred embodiment is directed to the third aspect, wherein the printed board includes a plurality of the substrate terminals disposed in alignment thereon, the insulating plate is formed with an opening window at a position corresponding to the electric component mounting portion of the case, and the pressing portions to be placed on the respective locking portions of the plurality of substrate terminals are formed integrally into a bridge structure extending linearly so as to straddle between opposed edge portions of the opening window.

In this configuration, with the provision of the pressing portion so as to straddle between the opposed edge portions of the opening window, both ends of the pressing portion in the extending direction are connected to a peripheral edge portion of the opening window, so that the rigidity of the pressing portion is maintained. Accordingly, deformation of the pressing portion is prevented, and the load exerted on the substrate terminal when pulling out the electric component can be held with a sufficient strength. It is effectively employed when all of the substrate terminals are terminals mounted directly on the substrate so as to project therefrom in particular.

A fifth aspect of a preferred embodiment is directed to any of the first to fourth aspects, wherein the opening window is formed on the insulating plate at a position corresponding to the electric component mounting portion of the case, and the pressing portion is formed so as to extend from a peripheral edge portion of the opening window into the opening window, while reinforcing portions extending from other portions of the peripheral edge portion of the opening window and being continued to the pressing portions are formed integrally with the insulating plate together with the pressing portions.

In this configuration, the rigidity of the pressing portion is maintained by integrally forming the reinforcing portion extending from a peripheral edge portion different from the peripheral edge portion of the opening window from which the pressing portion extends, so that the deformation of the substrate terminal is stably prevented.

A sixth aspect of a preferred embodiment is directed to any of the first to fifth aspects, wherein the pressing portion of the substrate terminal is provided at a gap with respect to an outer peripheral surface of the connecting portion extending upward from the surface of the printed board.

In this configuration, abutment of the pressing portion with respect to the substrate terminal can be prevented even when the pressing portion is deformed by thermal expansion by heat generated when soldering or when being used. Accordingly, problems such as occurrence of torsion of the substrate terminal due to the contact of the pressing portion can be avoided.

According to the aspects of a preferred embodiment, the locking portion of the substrate terminal to be placed on the printed board is configured to be pressed by the pressing portion formed integrally with the insulating plate. Accordingly, the printed board can be used effectively while alleviating the load exerted on the substrate terminal when pulling out the electric component such as the connector mounted on the electric component mounting portion from the electric component mounting portion with a small number of component.

DETAILED DESCRIPTION OF EMBODIMENTS

Figure 1:
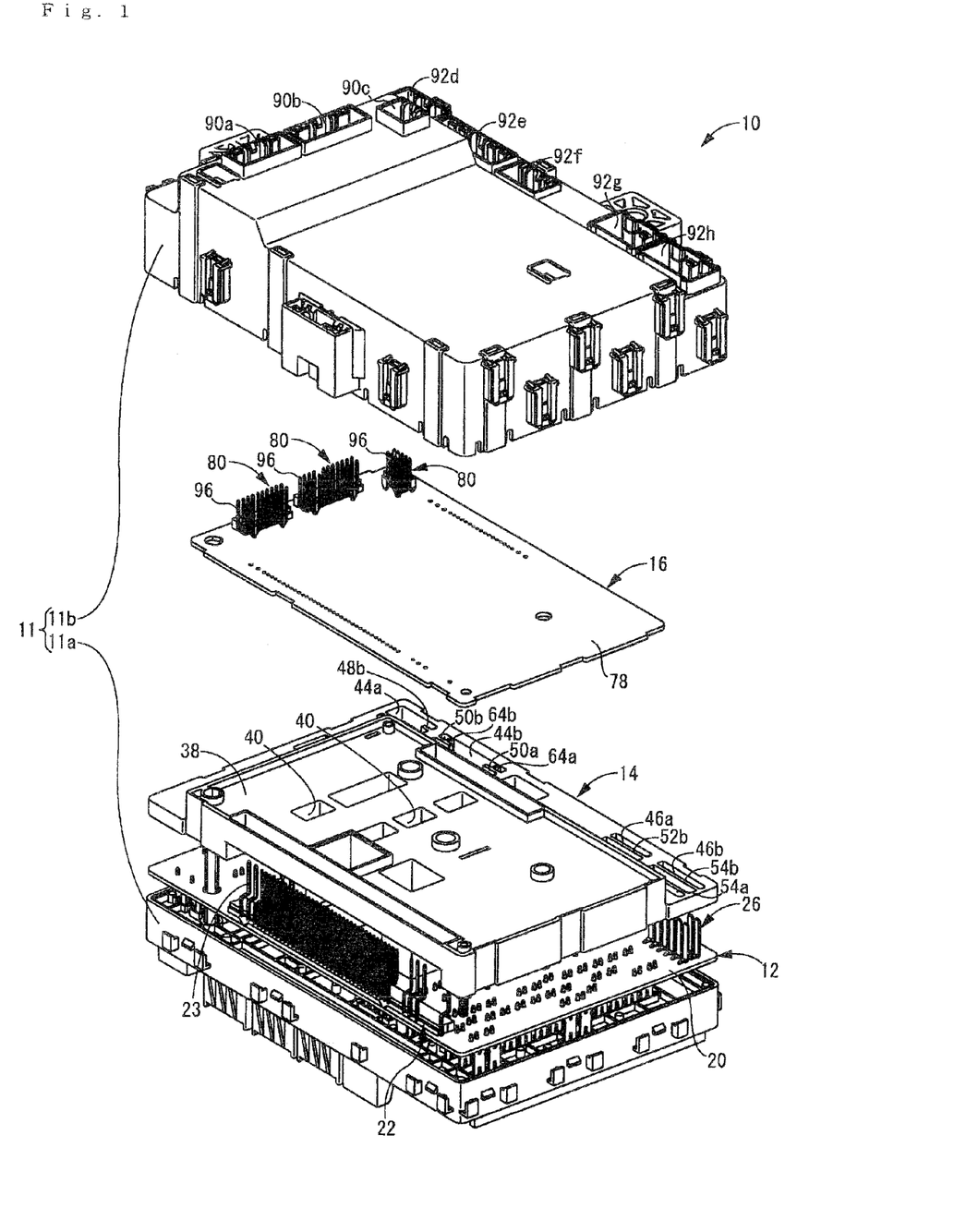
FIG. 1 is an exploded perspective view showing an electric connection box as an embodiment of a preferred embodiment.
Figure 2:
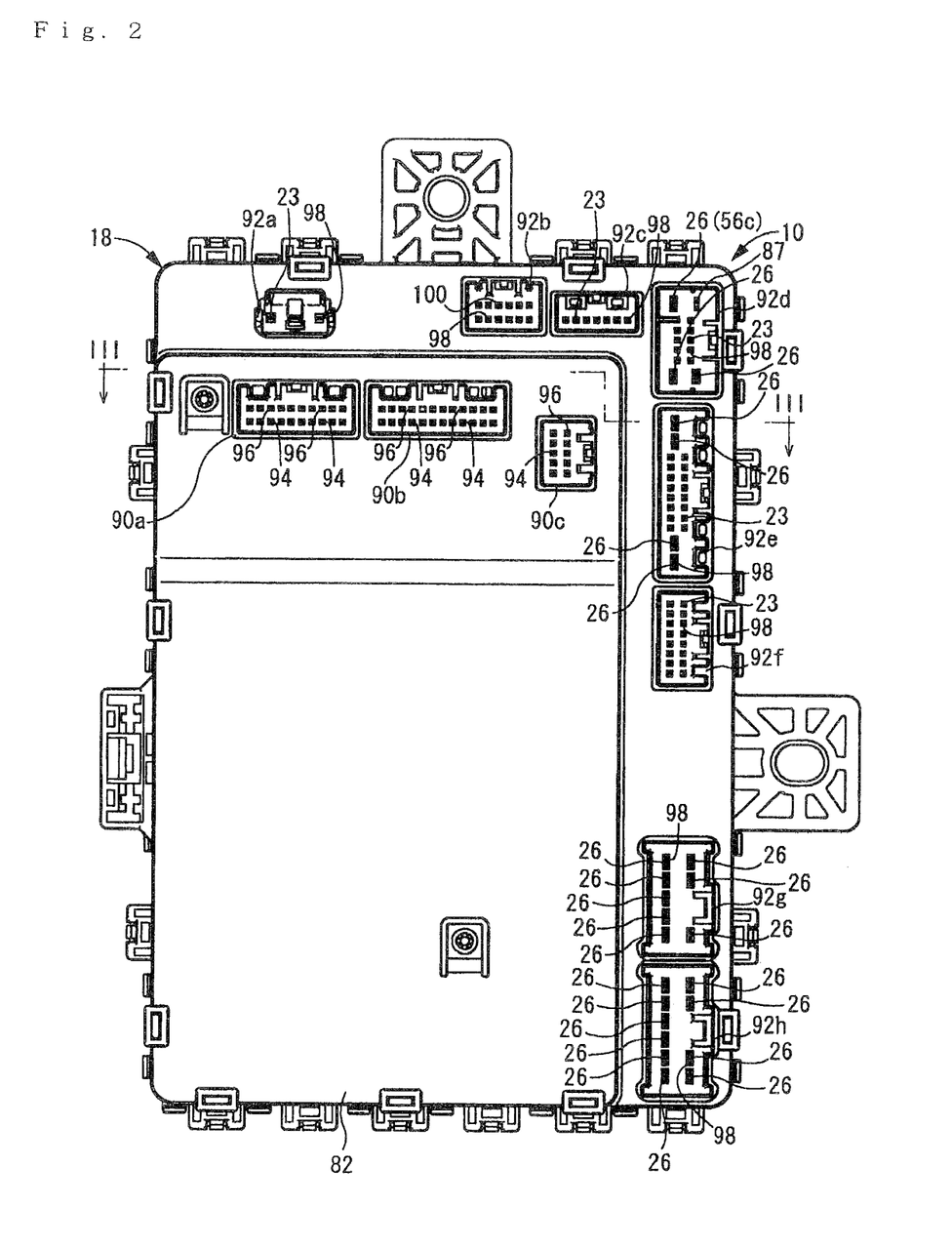
FIG. 2 is a plan view of the electric connection box shown in FIG. 1.
Figure 3:
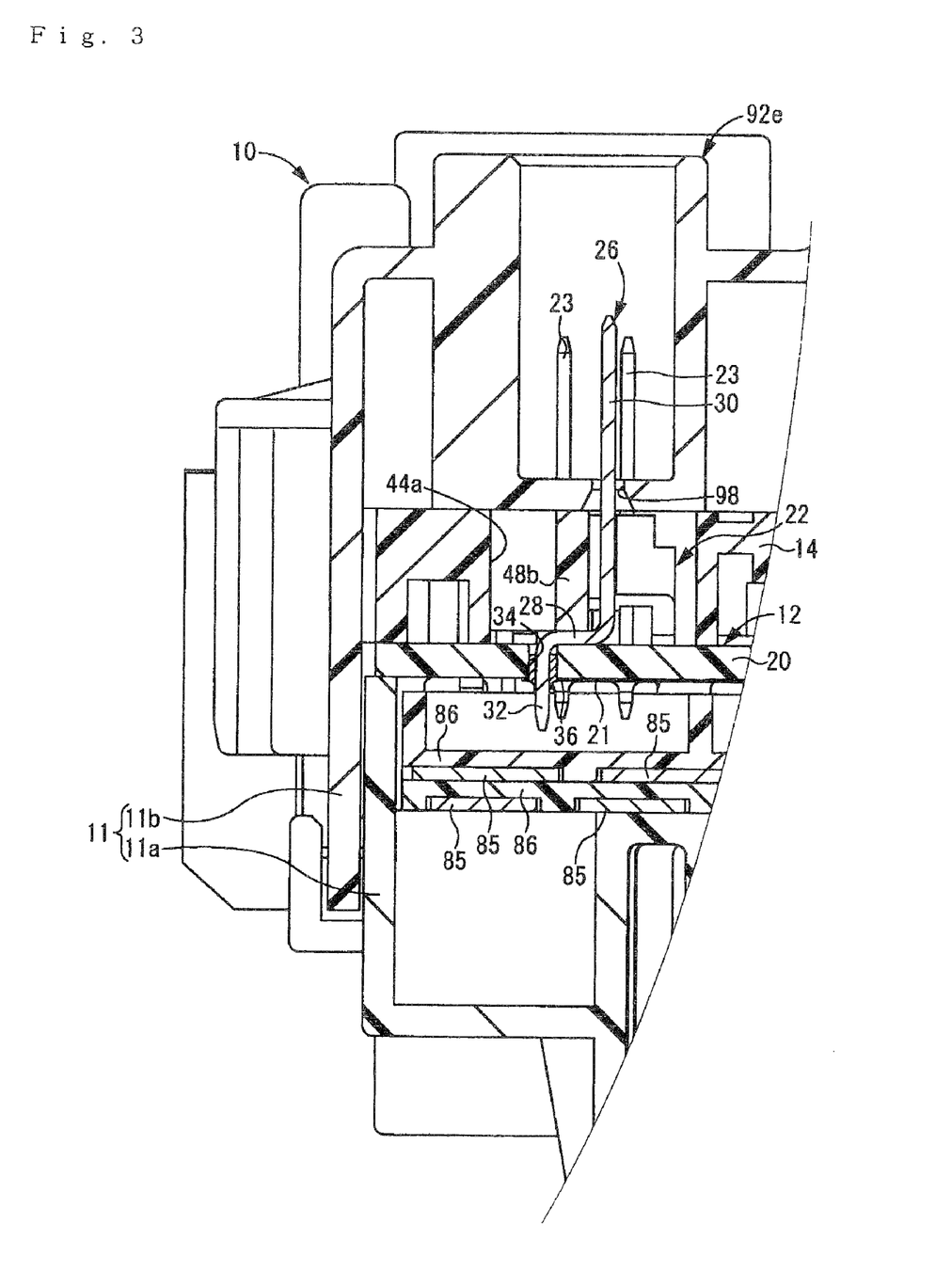
FIG. 3 is an enlarged cross-sectional view of a principal portion taken along the line in FIG. 2.

Referring now to the drawings, preferred embodiments will be described. In the following description, for purposes of explanation, numerous specific details are set forth in order to provide a thorough understanding of the present control device for a vehicle flasher assembly. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places of the specification are not necessarily all referring to the same embodiment In FIG. 1 to FIG. 3, an electric connection box 10 according to a preferred embodiment is shown. The electric connection box 10 includes a case 11, which includes a combination of an upper case 11a and a lower case 11b. A first printed board 12 as a printed board, an insulating plate 14 placed on the first printed board 12, and a second printed board 16 as a circuit body placed on the insulating plate 14 stacked one another are accommodated in the interior of the case 11. In the description shown below, the vertical direction means the vertical direction in FIG. 1 and FIG. 3 in principle. In FIG. 1 and FIG. 3, the upper case 11a is positioned on the lower side and the lower case 11b is positioned on the upper side.

Figure 4:
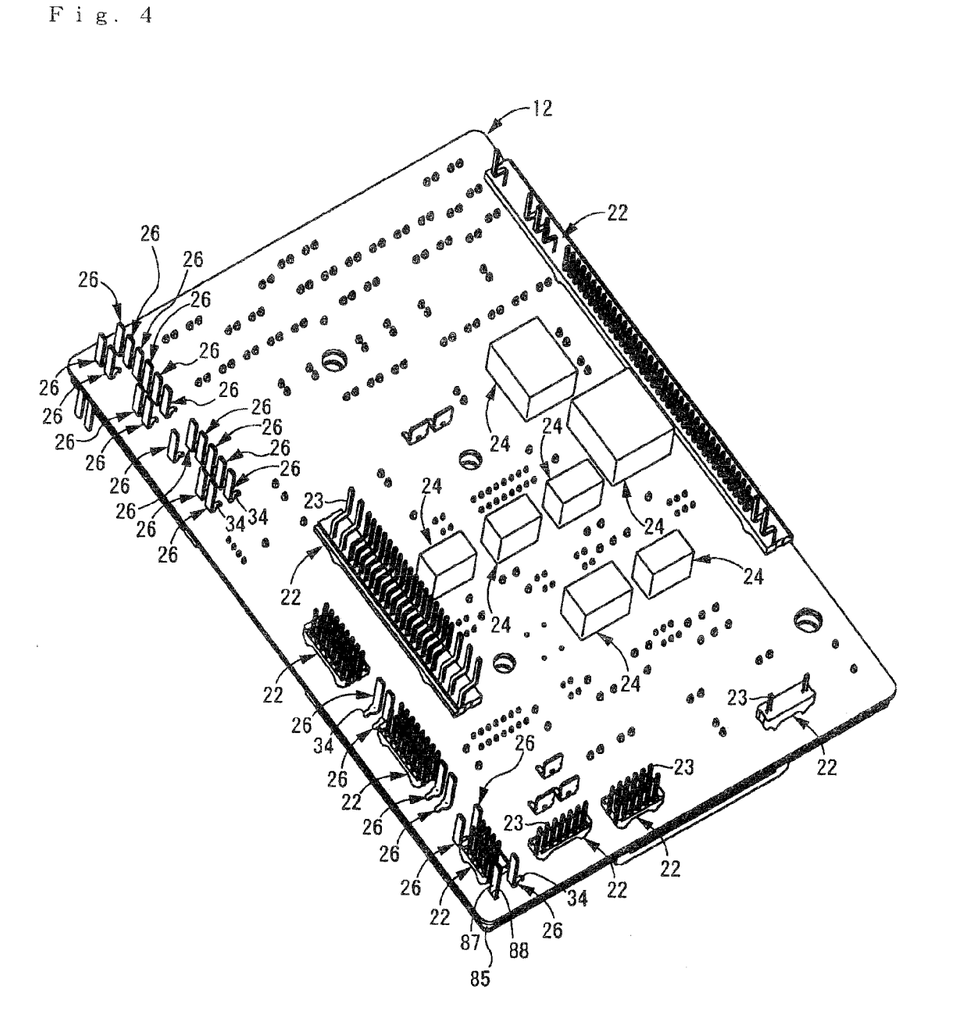
FIG. 4 is a perspective view of a printed board which constitutes the electric connection box shown in FIG. 1.

More specifically, the first printed board 12 has a configuration having a conducting path 21 formed on the surface of an insulating base material 20 as shown in FIG. 3, and includes electric components such as base seat connectors 22 having a plurality of male terminals 23 mounted and held thereon and relays 24 mounted thereon as shown in FIG. 4. In FIG. 4, illustration of the conducting path 21 is omitted.

The first printed board 12 is also provided with a plurality of so-called directly-mounted substrate terminals 26 which are not held by a terminal base seat or the like, but are mounted directly on the first printed board 12 so as to project therefrom. The plurality of substrate terminals 26 are formed by press-stamping a conductive metallic plate such as copper alloy or the like, and each have a rectangular plate shape having a crank-shaped locking portion 28 on an intermediate portion thereof in the longitudinal direction (see FIG. 3). The each substrate terminal 26 includes a connecting portion 30 to be connected to a counterpart on one side and a soldered portion 32 on the other side in the longitudinal direction with the locking portion 28 interposed therebetween.

The substrate terminals 26 configured as described above are mounted on the first printed board 12 with the locking portions 28 thereof placed on the surface of the first printed board 12. In this state, the soldered portions 32 are inserted through holes 34 formed in the first printed board 12, and the connecting portion 30 extends upward substantially vertically from the surface of the first printed board 12. The substrate terminals 26 are fixed to the first printed board 12 by the soldered portions 32 soldered to lands 36 provided on the conducting paths 21 formed on a back surface of the first printed board 12.

Figure 5:
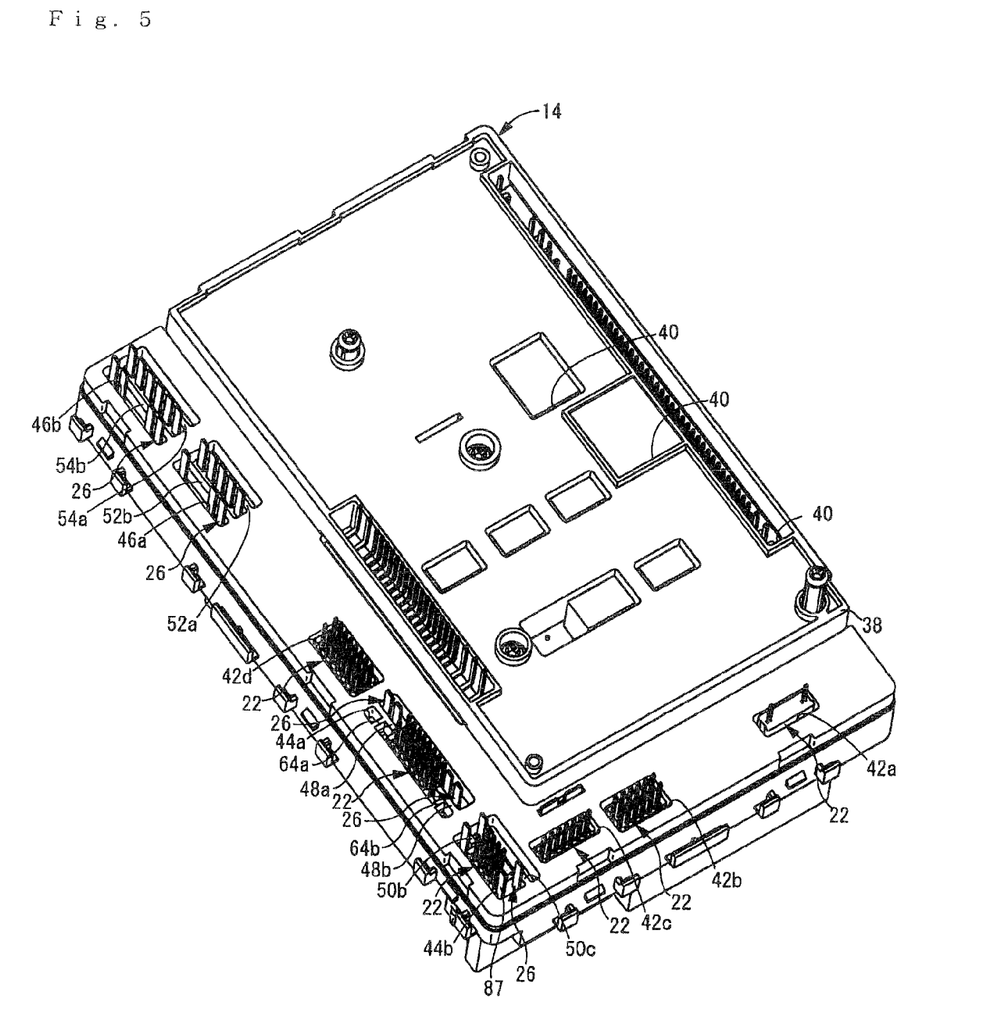
FIG. 5 is a perspective view of a state in which an insulating plate is placed on the printed board shown in FIG. 4.

FIG. 5 shows the insulating plate 14 placed on the back surface side of the first printed board 12 as described above. The insulating plate 14 is formed of synthetic resin, and has a thick rectangular plate shape as a whole. The insulating plate 14 is provided with a substrate supporting portion 38 and the second printed board 16 is placed thereon. The thickness of the substrate supporting portion 38 is larger than other portions of the insulating plate 14.

The substrate supporting portion 38 of the insulating plate 14 is provided with a plurality of component accommodating holes 40 having a substantially uniform rectangular cross section and penetrating through the insulating plate 14 in the thickness direction. In the state in which the insulating plate 14 is placed on the first printed board 12, the base seat connectors 22 and the relay 24 mounted on the first printed board 12 are accommodated in the component accommodating holes 40.

The insulating plate 14 is formed with a plurality of opening windows 42*a* to 42*d*, 44*a* to 44*b*, and 46*a* to 46*b* having a substantially rectangular cross section on peripheral edge portions of the substrate supporting portion 38 (portions which are not covered with the second printed board 16) so as to penetrate therethrough in the thickness direction. The plurality of opening windows 42*a* to 42*d*, 44*a* to 44*b*, and 46*a* to 46*b* are provided at positions corresponding to connector accommodating portions 92*a* to 92*h*, described later, provided on the lower case 11*b*. In a state in which the insulating plate 14 is placed on the first printed board 12, the base seat connectors 22 projecting from the first printed board 12 are inserted through and arranged in the opening windows 42*a* to 42*d*, while the base seat connectors 22 and the substrate terminals 26 projected from the first printed board 12 are inserted through and arranged in the opening windows 44*a* and 44*b* respectively. In the opening windows 46*a* and 46*b*, only the plurality of substrate terminals 26 projecting from the first printed board 12 are inserted and arranged.

In particular, pressing portions 48, 50, and 52 extending from peripheral edge portions of the opening windows 44 and 46 into the windows are integrally formed in the opening windows 44*a* to 44*b* and the opening windows 46*a* to 46*b* in which the substrate terminals 26 are inserted and arranged. Specific shapes of the pressing portions 48, 50, and 52 pressed by the locking portion 28 of the substrate terminals 26 directly mounted on the substrate so as to project therefrom will be described in detail below.

Figure 6:
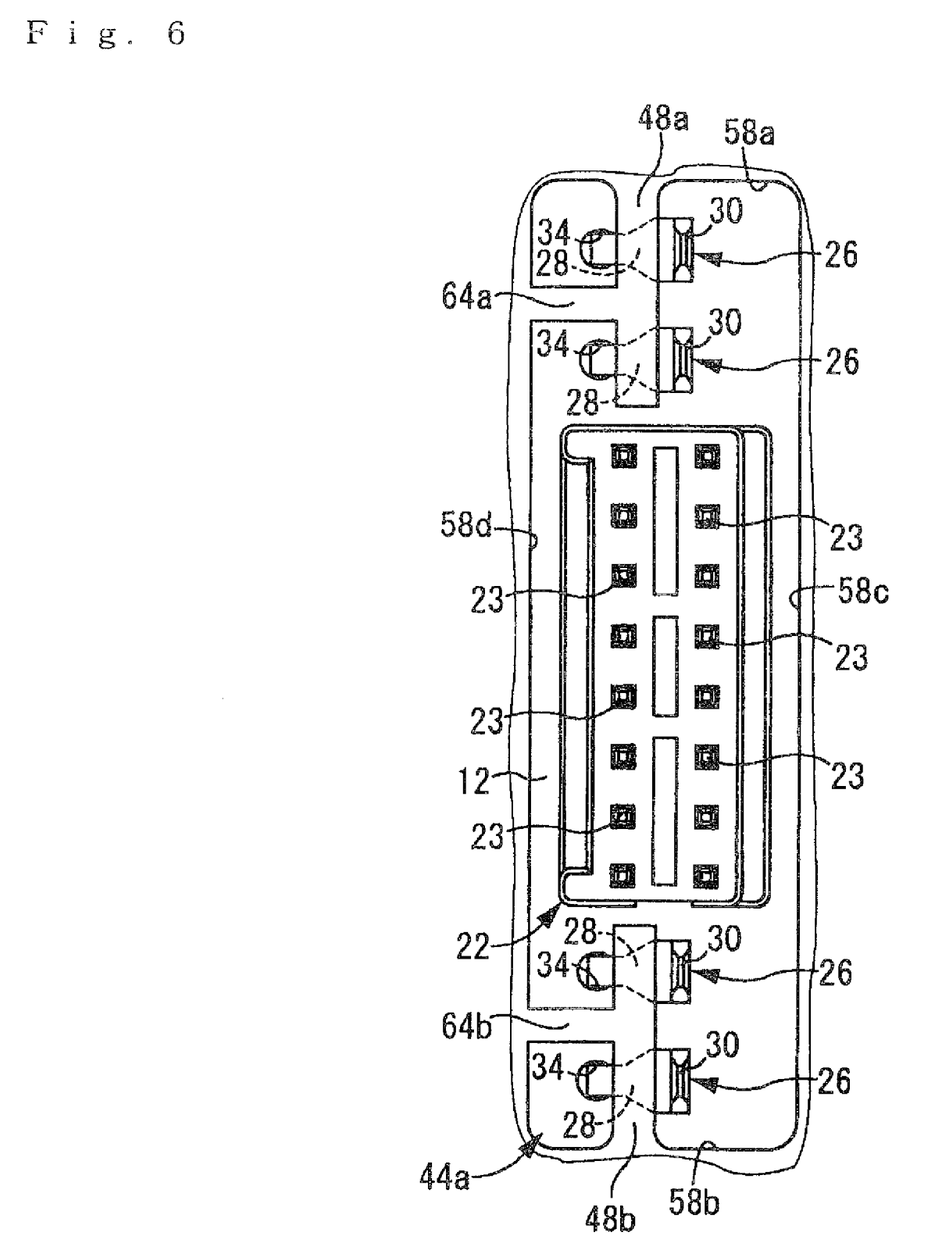
FIG. 6 is an enlarged plan view showing a principal portion in FIG. 5.

FIG. 6 illustrates a top view of the opening window 44*a* of the insulating plate 14 placed on the first printed board 12 in an enlarged scale. The base seat connector 22 is accommodated in a substantially center portion of the opening window 44*a*, and the male terminals 23 are arranged in two rows in parallel to the longitudinal direction (vertical direction in FIG. 6) of the opening window 44*a*. Two each of the substrate terminals 26 are formed so as to project on both sides of the base seat connector 22 in the longitudinal direction of the opening window 44*a*, and are arranged in line so that the widthwise direction of the each substrate terminal 26 lies in parallel to the longitudinal direction of the opening window 44*a*.

Pressing portions 48*a* and 48*b* each having a substantially uniform rectangular cross section and extending straightly inward of the opening window 44*a* are provided on a pair of side surfaces 58*a* and 58*b* opposing with each other in the longitudinal direction of the opening window 44*a*. The respective pressing portions 48*a* and 48*b* extend to positions near the base seat connector 22, and extend so as to straddle the two substrate terminals 26, respectively. Upper end surfaces of the respective pressing portions 48*a* and 48*b* are substantially flush with the surface of the insulating plate 14, and are connected smoothly thereto. Lower end surfaces of the respective pressing portions 48*a* and 48*b* are positioned upward of the back surface of the insulating plate 14.

The lower end surfaces of the pressing portions 48*a* and 48*b* having the structure as described above are both placed on the locking portions 28 provided on the substrate terminals 26 as the pressing portion 48*b* shown in FIG. 3 and hold the locking portions 28 of the substrate terminals 26. In this state, side surfaces of the pressing portions 48*a* and 48*b* oppose outer peripheral surfaces of the connecting portions 30 of the respective substrate terminals 26 with a gap therebetween. Accordingly, even though the pressing portions 48*a* and 48*b* are thermally expanded, abutment of the pressing portions 48*a* and 48*b* with the respective substrate terminals 26 is avoided.

The peripheral edge portion of the opening window 44*a* is integrally formed with reinforcing portions 64*a* and 64*b* extending into the opening window 44*a* from other portions of the peripheral edge portion in the direction orthogonal to the direction of extension of the pressing portions 48*a* and 48*b* and connected to the pressing portions 48*a* and 48*b*.

The respective reinforcing portions 64*a* and 64*b* extend in the inner peripheral surface of the opening windows 44*b* straightly in a substantially uniform rectangular cross section from one side surface (side surface 58*c*) of a pair of side surfaces 58*c* and 58*d* opposing in the direction of short sides (lateral direction in FIG. 6) of the opening window 44*a* to the other side surface (side surface 58*d*). The reinforcing portions 64*a* and 64*b* are then connected to the pressing portions 48*a* and 48*b* between the substrate terminals 26 and 26, respectively. Accordingly, the rigidity of the elongated pressing portions 48*a* and 48*b* extending from the side surfaces 58*a* and 58*b* of the opening window 44*a* is secured.

An upper end surface of the reinforcing portion 64*a* is flush with the upper end surfaces of the pressing portion 48*a* or the insulating plate 14 and is continued smoothly thereto, and the upper end surface of the reinforcing portion 64*b* is flush with the upper end surfaces of the pressing portion 48*b* and the insulating plate 14 and is continued smoothly thereto. Although not shown clearly in the drawing, a lower end surface of the reinforcing portion 64*a* is flush with the lower end surfaces of the pressing portion 48*a* and is continued smoothly thereto, and the lower end surface of the reinforcing portion 64*b* is flush with the lower end surfaces of the pressing portion 48*b* and is continued smoothly thereto.

Figure 7:
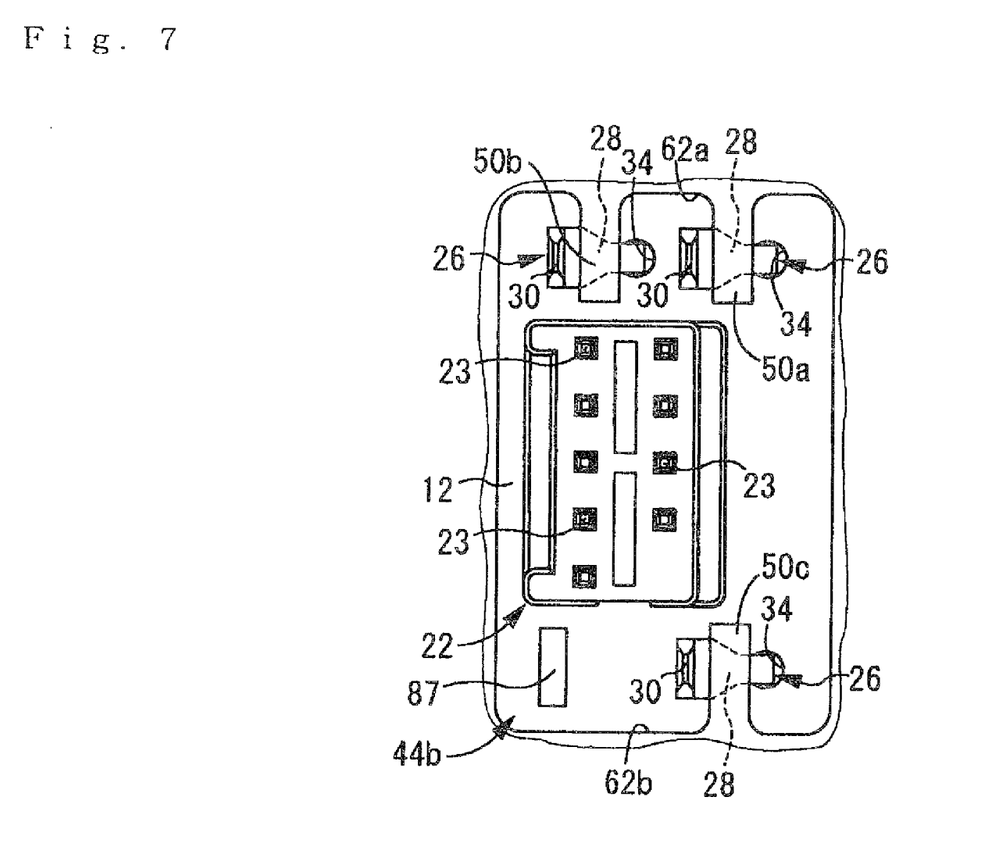
FIG. 7 is an enlarged plan view showing a principal portion in FIG. 5.

FIG. 7 illustrates a top view of the opening window 44*b* of the insulating plate 14 placed on the first printed board 12 in an enlarged scale. The base seat connector 22 is accommodated in the substantially center portion of the opening window 44b, and the male terminals 23 arranged in two rows on that the direction of arrangement of the male terminals 23 extend in parallel to the longitudinal direction (vertical direction in FIG. 7) of the opening window 44b. In the longitudinal direction of the opening windows 44b, the two substrate terminals 26 are arranged on one side of the base seat connector 22 (the upper side in FIG. 7) with the widthwise direction thereof laid in parallel with the longitudinal direction of the opening windows 44b at an adequate distance from each other in the direction of the short sides of the opening windows 44b (lateral direction in FIG. 7) at the same positions in the direction of the long sides of the opening windows 44b. In contrast, two terminals are provided so as to project therefrom on the other side of the base seat connector 22 (the lower side in FIG. 7) at positions corresponding to the one side. One of these terminals (the right side in FIG. 7) is the substrate terminal 26 and the other one is a bus bar terminal 87 supported by a bus bar insulating plate 86, described later.

In the same manner as the opening window 44a, pressing portions 50a, 50b, and 50c each having a substantially constant rectangular cross section and extending straightly inward of the opening window 44b are provided on a pair of side surfaces 62a and 62b opposing with each other in the longitudinal direction of the opening window 44b. The respective pressing portions 50a, 50b, and 50c extend beyond the locking portions 28 of the substrate terminals 26 to positions near the base seat connector 22. Upper end surfaces of the respective pressing portions 50a, 50b, and 50c are substantially flush with the surface of the insulating plate 14, and are continued smoothly thereto. Lower end surfaces of the respective pressing portions 50a, 50b, and 50c are positioned upward of the back surface of the insulating plate 14.

Like the pressing portion 48b shown in FIG. 3, all of the lower end surfaces of the pressing portions 50a to 50c having the structure as described above are placed on the locking portions 28 provided on the respective substrate terminals 26 and hold the locking portions 28 of the respective substrate terminals 26. Side surfaces of the respective pressing portions 50a to 50c oppose the outer peripheral surfaces of the connecting portions 30 of the respective substrate terminals 26 with a gap provided therebetween.

The respective pressing portions 50a to 50c are not reinforced by the reinforcing portion because the extending lengths from the side surfaces 62a and 62b of the opening windows 44b is shorter than the pressing portions 48a and 48b provided on the opening window 44a.

Figure 8:
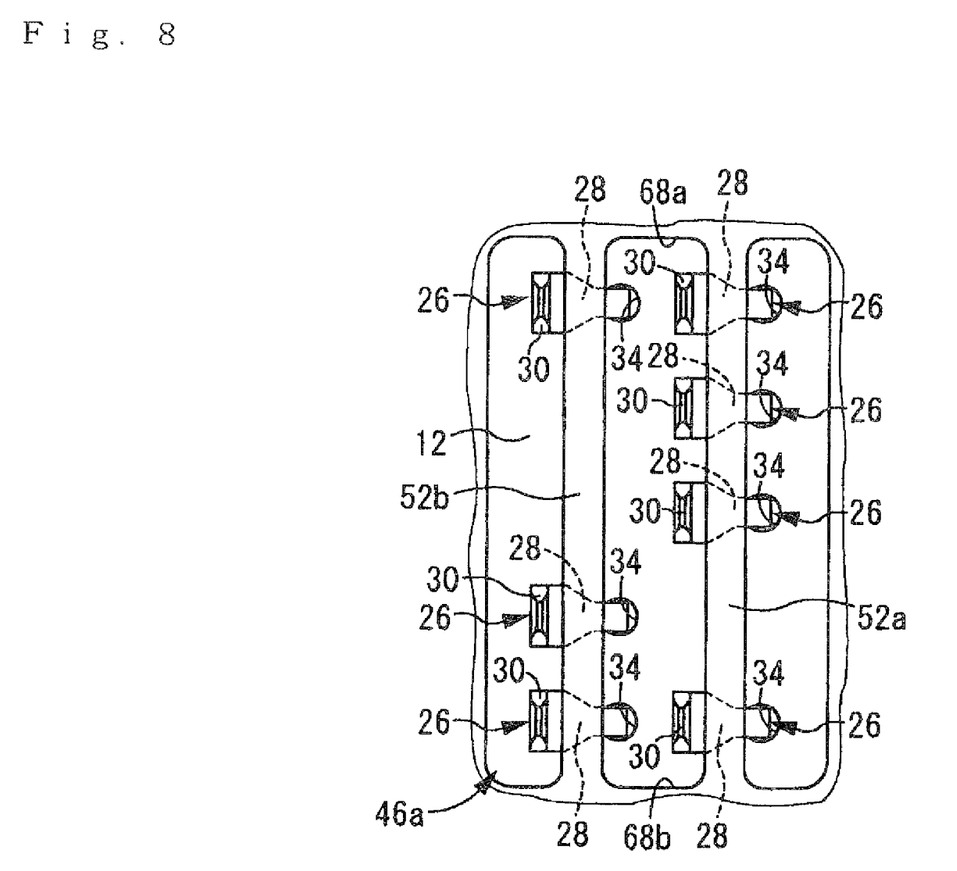
FIG. 8 is an enlarged plan view showing a principal portion in FIG. 5.
Figure 9:
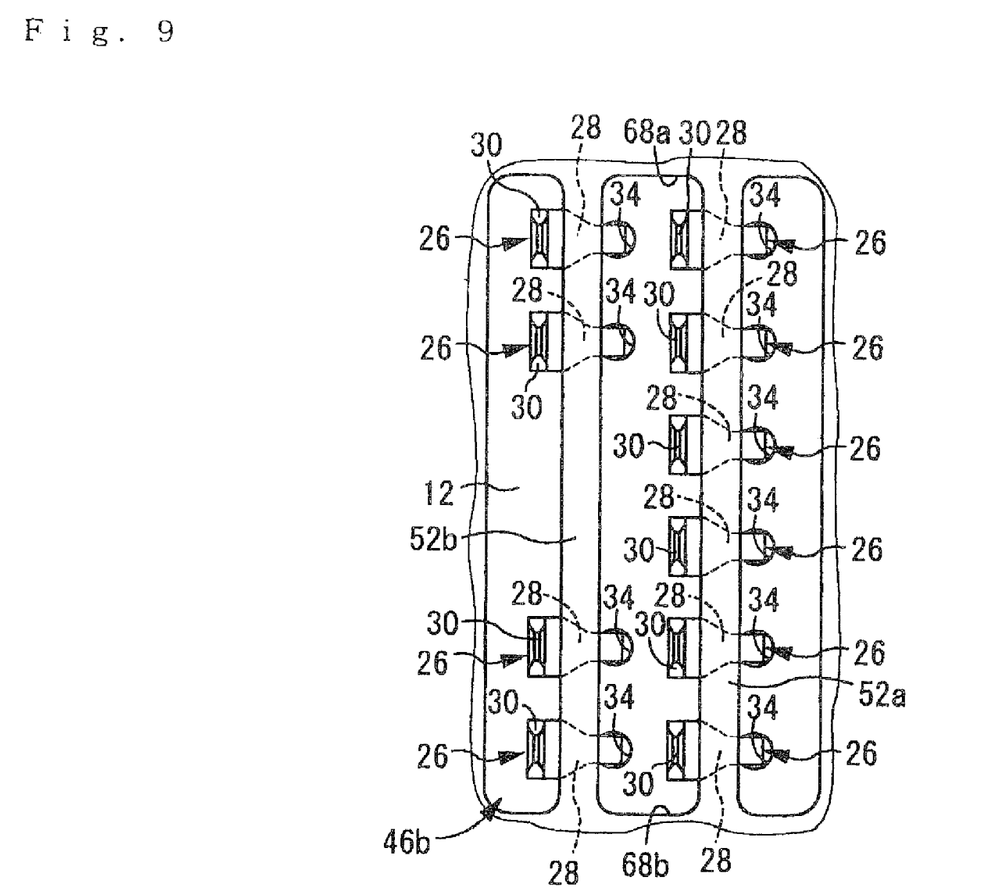
FIG. 9 is an enlarged plan view showing a principal portion in FIG. 5.

FIGS. 8 and 9 illustrate top views of the opening windows 46a and 46b of the insulating plate 14 placed on the first printed board 12 in an enlarged scale. The opening window 46a and the opening window 46b are the same in basic structure except for the number of the substrate terminals 26 to be inserted therethrough. Therefore, the opening window 46a will be described in detail below, and description of the opening window 46b will be omitted by assigning the same reference numerals.

The plurality of substrate terminals 26 are inserted through and arranged in the opening window 46a. The plurality of substrate terminals 26 are arranged in two rows extending in the longitudinal direction of the opening window 46a (vertical direction in FIG. 8), and the respective substrate terminals 26 are arranged with the widthwise direction thereof laid in parallel to the longitudinal direction of the opening window 46a.

The opening window 46a is provided with two bridge shaped pressing portions 52a and 52b extending so as to straddle edge portions of the opening window 46a opposing in the directions of the long sides of the opening window 46a.

The respective pressing portions 52a and 52b have a shape extending straightly between a pair of side surfaces 68a and 68b opposing in the direction of the long sides of the opening window 46a and having a substantially uniform rectangular cross section in an inner peripheral surface of the opening window 46a. Upper end surfaces of the respective pressing portions 52a and 52b are flush with the surface of the insulating plate 14 and are continued smoothly to the surface of the insulating plate 14.

A lower end surface of the pressing portion 52a is positioned above the back surface of the insulating plate 14, and is placed on the locking portions 28 provided on the respective substrate terminals 26 which form one of the rows as in the case of the pressing portion 48b shown in FIG. 3. Accordingly, the pressing portion 52a holds the locking portions 28 provided on the respective substrate terminals 26 which form one of the rows.

A lower end surface of the pressing portion 52b is positioned on the front surface side with respect to the back surface of the insulating plate 14, and is placed on the locking portions 28 provided on the respective substrate terminals 26 which form the other row as in the case of the pressing portion 48b shown in FIG. 3. Accordingly, the pressing portion 52a holds the locking portions 28 provided on the respective substrate terminals 26 which form the other row.

In the same manner as the pressing portion 48b shown in FIG. 3, the pressing portions 52a and 52b are disposed at a gap from the connecting portions 30 of the respective substrate terminals 26 projecting upward from the locking portions 28, on which the lower surfaces thereof are placed.

The second printed board 16 is placed on the substrate supporting portion 38 of the insulating plate 14 having the structure as described above. The second printed board 16 has a structure in which a conducting path, not shown, is formed on at least one of the front and back surfaces of an insulating base material 78, and includes base seat connectors 80 mounted thereon.

The first printed board 12 having the insulating plate 14 and the second printed board 16 stacked thereon as described above are accommodated in the case 11. In other words, the lower case 11b from the side of the second printed board 16 and the upper case 11a from the side of the first printed board 12 are fitted and are fixed to each other in abutment to each other at the respective opening peripheral edge portions. Accordingly, the electric connection box 10 in which the first printed board 12 having the insulating plate 14 and the second printed board 16 stacked thereon are accommodated and arranged in the interior of the case 11 is formed.

As shown in FIG. 3, the bus bar insulating plate 86 having bus bars 85 which form upon/or supply circuit to the first printed board 12 or the second printed board 16 assembled thereto is stacked between the first printed board 12 and the upper case 11a. One of the bas bar terminals 87 provided at end edge portions of the bus bars 85 projects from the back surface of the first printed board 12 through a through hole 88 formed on the first printed board 12 (see FIG. 4).

The lower case 11b is provided with a plurality of connector accommodating portions 90 and 92 as electric component mounting portions having peripheral walls projecting from the outer surface. Connector accommodating portions 90a to 90c are provided at positions corresponding to the base seat connectors 80 mounted on the second printed board 16. Connector accommodating portions 92a to 92h are provided at positions corresponding to the opening windows 42, 44 and 46 opening in the insulating plate 14.

Bottom walls of the respective connector accommodating portions 90a to 90c are formed with terminal insertion holes

94, and male terminals 96 provided on the base seat connector 80 project outward from the case 11 through the terminal insertion holes 94. Bottom walls of the respective connector accommodating portions 92a to 92h are formed with terminal insertion holes 98, and the male terminals 23 and the substrate terminals 26 provided on the base seat connector 22 project outward from the case 11 through the terminal insertion holes 98.

As shown in FIG. 3, the bottom walls of the connector accommodating portion 92e provided at a position corresponding to the opening window 44a is placed on the peripheral edge portion of the opening window 44a of the insulating plate 14 over the entire circumference thereof. Although not shown, the bottom walls of the connector accommodating portions 92d, 92g, and 92h provided at positions corresponding to the opening windows 44b, 46a, and 46b are also placed on the peripheral edge portions of the opening windows 44b, 46a, and 46b of the insulating plate 14 over the entire circumference thereof in the same manner as the connector accommodating portion 92e.

The external connectors provided at terminals of external electric wires, not shown, are inserted into the connector accommodating portions 90 and 92 as described above. Accordingly, the external electric wires are connected to the male terminals 96 provided in the connector accommodating portions 90 so as to project from the bottom walls thereof, and the male terminals 23 and the substrate terminals 26 provided in the connector accommodating portions 92 so as to project from the bottom walls thereof.

In the electric connection box 10 as described above, since the pressing portions 48, 50, and 52 are placed on the locking portions 28 provided on the substrate terminals 26, a pulling load exerted on the substrate terminals 26 when pulling out the external connectors inserted into the connector accommodating portions 92d, 92e, 92g, and 92h is dispersed over the insulating plate 14. Accordingly, the load exerted to soldered portions of the substrate terminals 26 when pulling out the external connectors from the connector accommodating portions 92d, 92e, 92g, and 92h can be alleviated. Consequently, occurrence of problems such as occurrence of cracks at the soldered portions of the substrate terminals 26 can be prevented.

Since the bottom walls of the connector accommodating portions 92d, 92e, 92g, and 92h are placed on the pressing portions 48, 50, and 52, which are placed on the locking portions 28 of the substrate terminals 26, rigidity of the pressing portions 48, 50, and 52 can be increased. Therefore, the load exerted to the soldered portions of the substrate terminals 26 when pulling out the external connectors from the connector accommodating portions 92d, 92e, 92g, and 92h can further be alleviated.

The pressing portions 48, 50, and 52 are not placed on the first printed board 12 so as to protrude significantly therefrom. Therefore, the first printed board 12 can be used effectively without limiting the area on the first printed board 12 to be used.

The pressing portions 48, 50, and 52 are formed on the first printed board 12 by effectually using the insulating plate 14, which is required for placing a separate circuit body such as the second printed board 16. Therefore, the need to provide an additional component for alleviating the load exerted to the substrate terminals 26 directly mounted on the substrate so as to project therefrom is eliminated.

The bottom walls of the connector accommodating portions 92d, 92e, 92g, and 92h are placed on the peripheral edge portions of the opening windows 44a, 44b, 46a, and 46b formed on the insulating plate 14. Therefore, an insertion load generated when inserting the external connectors to the connector accommodating portions 92d, 92e, 92g, and 92h is dispersed over the insulating plate 14. Accordingly, the load exerted to the soldered portions of the substrate terminals 26 when inserting the external connectors from the connector accommodating portions 92d, 92e, 92g, and 92h can be alleviated.

Since the pressing portions 48, 50, and 52 are placed on intermediate portions of the locking portion 28 in the direction of extension thereof, the soldered portions 32 of the substrate terminals 26 are not covered with the pressing portions 48, 50, and 52. Therefore, the soldered portions of the substrate terminals 26 can easily be inspected.

Since a gap is provided between the connecting portions 30 of the substrate terminals 26 and the pressing portions 48, 50, and 52, contact of the pressing portions 48, 50, and 52 to the connecting portions 30 can be avoided even though the pressing portions 48, 50, and 52 are deformed by heat generated when soldering or being used. Consequently, occurrence of problems such as torsion of the substrate terminals 26 caused by the contact of the pressing portions 48, 50, and 52 to the connecting portions 30 can be prevented.

Since the reinforcing portion 64a is provided continuously to the pressing portion 48a and the reinforcing portion 64b is provided continuously to the pressing portion 48b, rigidity of the respective pressing portions 48a and 48b can be increased. Therefore, the load exerted to the soldered portions of the substrate terminals 26 when pulling out the external connector from the connector accommodating portion 92e can further be alleviated.

Since the pressing portions 52a and 52b extend so as to straddle edge portions of the opening windows 46a and 46b opposing in the direction of the long sides, the rigidity of the pressing portions 52a and 52b can be increased. Therefore, the load exerted to the soldered portions of the substrate terminals 26 when pulling out the external connectors from the connector accommodating portions 92g and 92h can further be alleviated.

Although several embodiments have been described, the invention is not limited by the detailed description. For example, the pressing portion does not have to be in contact with the locking portions from the beginning as in the embodiment. It is also possible to configure in such a manner that the pressing portions come into contact with the locking portions when the substrate terminals are deformed or displaced due to the pulling load exerted thereto. In this case as well, further deformation or displacement of the substrate terminals can be prevented by the contact of the pressing portions with respect to the locking portions.

Provision of the reinforcing portions so as to continue to the pressing portions 52a and 52b provided in the opening windows 46a and 46b are also applicable as a matter of course.

The accompanying drawings illustrate various embodiments of the present system and method and are part of the specification. The illustrated embodiments are merely examples of the present system and method and are not intended to limit the scope thereof.

Throughout the drawings, identical reference numbers designate similar, but not necessarily identical elements.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain principles and practical applications of the invention, and to thereby enable others skilled in the art to best utilize the invention and various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims of the present invention.

What is claimed is:

1. An electric connection box comprising:
a printed board;
a circuit body stacked on the printed board with an insulating plate interposed therebetween; and
a substrate terminal formed so as to project from a surface of the printed board on a side of the printed board facing the circuit board, the substrate terminal projecting to an outside of a case accommodating the printed board and the circuit body through an insertion hole of an electric component mounting portion formed on the case, wherein
the substrate terminal includes a locking portion formed on a base portion thereof and placed on the surface of the printed board, and
the insulating plate includes a pressing portion integrally formed therewith to press the locking portion.

2. The electric connection box according to claim 1, wherein a peripheral edge portion of the electric component mounting portion of the case is placed on the insulating plate.

3. The electric connection box according to claim 1, wherein the substrate terminal includes a connecting portion extending upright from the surface of the printed board and a soldered portion soldered to a conducting path on the printed board on both sides of the locking portion with respect to the direction of the length of the terminal, and the pressing portion is provided apart from the soldered portion.

4. The electric connection box according to claim 3, wherein the printed board includes a plurality of the substrate terminals disposed in alignment thereon, the insulating plate is formed with an opening window at a position corresponding to the electric component mounting portion of the case, and the pressing portions to be placed on the respective locking portions of the plurality of substrate terminals are formed integrally into a bridge structure extending linearly so as to straddle between opposed edge portions of the opening window.

5. The electric connection box according to claim 1, wherein the opening window is formed on the insulating plate at a position corresponding to the electric component mounting portion of the case, and the pressing portion is formed so as to extend from a peripheral edge portion of the opening window into the opening window, while reinforcing portions extending from other portions of the peripheral edge portion of the opening window and being continued to the pressing portions are formed integrally with the insulating plate together with the pressing portions.

6. The electric connection box according to claim 1, wherein the pressing portion of the substrate terminal is provided at a gap with respect to an outer peripheral surface of the connecting portion extending upward from the surface of the printed board.

* * * * *